Sept. 23, 1924.
H. R. DECKER
ROTARY
Filed Sept. 18, 1920
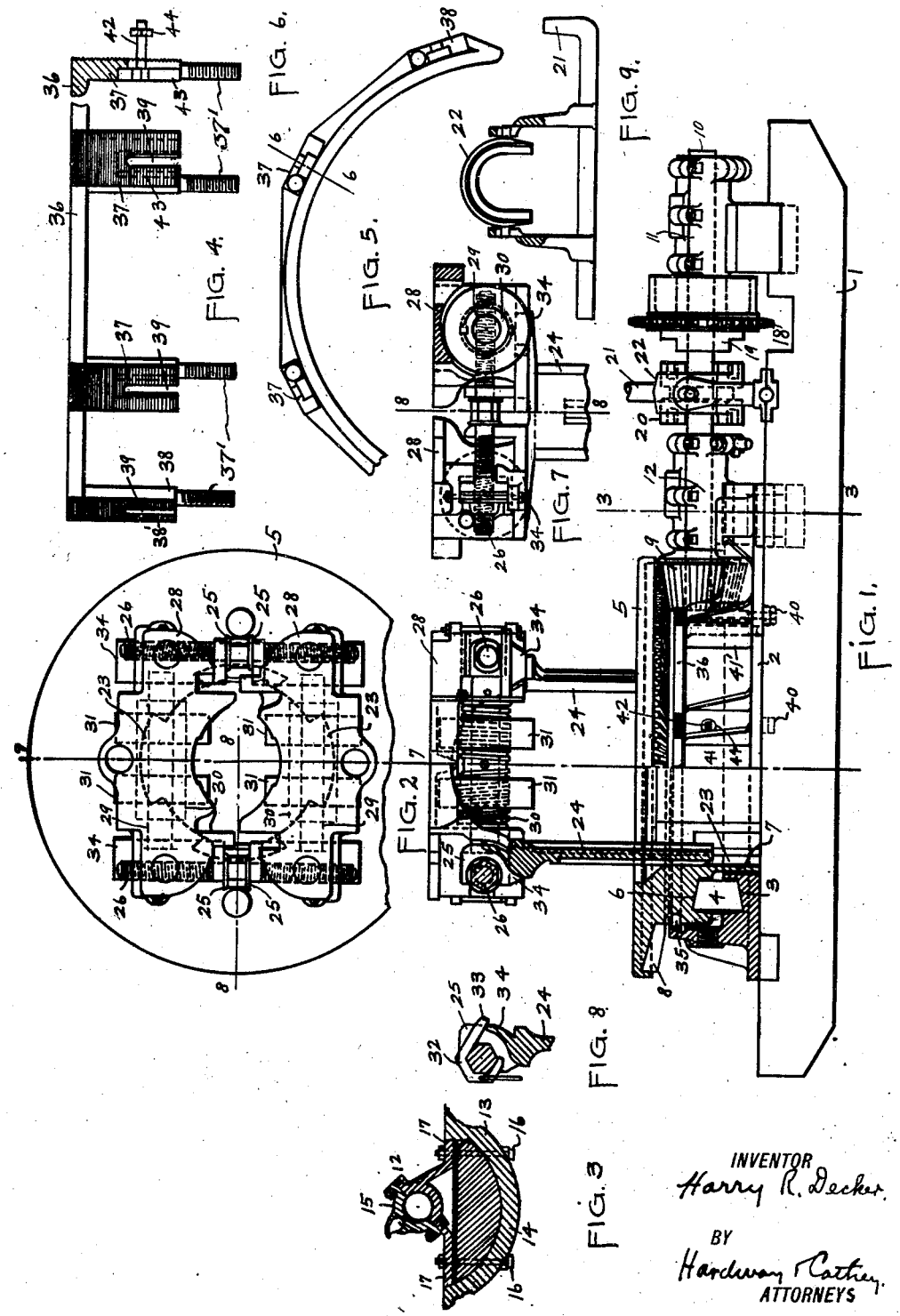

Patented Sept. 23, 1924.

1,509,547

UNITED STATES PATENT OFFICE.

HARRY R. DECKER, OF HOUSTON, TEXAS.

ROTARY.

Application filed September 18, 1920. Serial No. 411,270.

*To all whom it may concern:*

Be it known that I, HARRY R. DECKER, a citizen of the United States, residing at Houston, in the county of Harris and State of Texas, have invented certain new and useful Improvements in a Rotary, of which the following is a specification.

This invention relates to new and useful improvements in a rotary.

One object of the invention is to provide a rotary designed to be used in drilling wells and embodying a novel means for holding the rotary table on the bed plate.

Another object of the invention is to provide in a rotary a locking device designed to prevent the spreading of the grip rings of the gripping device, through which the drill stem is rotated. A further feature of the invention resides in the provision of an improved form of a bearing, for the drive shaft.

With the above and other objects in view, the invention has particular relation to certain novel features of construction, operation and arrangement of parts, an example of which is given in this specification, and illustrated in the accompanying drawings, wherein:—

Figure 1 represents a side view of the rotary, shown partially in section.

Figure 2 shows a plan view of the rotary table with the pipe gripping device mounted thereon.

Figure 3 shows a transverse sectional view of the shaft bearing, taken on the line 3—3 of Figure 1.

Figure 4 shows a side view of the anchor employed to hold the table on the base plate.

Figure 5 shows a bottom view thereof.

Figure 6 shows a transverse sectional view taken on the line 6—6 of Figure 5.

Figure 7 shows an end elevation of the pipe gripping device which is shown partially in section.

Figure 8 shows a fragmentary sectional view taken on the lines 8—8 of Figures 2 and 7, and Figure 9 shows a side view partially in section of the clutch yoke employed.

Referring now more particularly to the drawings, wherein like numerals of reference designate similar parts in each of the figures, the numeral 1 designates the supporting sills whereon the base plate 2 is mounted. This base plate is provided with an annular race-way 3 wherein the roller bearings 4 are located, and mounted upon these bearings is the rotary table 5 whose underside is provided with a race-way 6 which receives the bearings 4. The base plate has a central opening therethrough, through which the sleeve 7, depending from the rotary, extends. The underside of the table is formed with a beveled gear face 8 with which the pinion 9 meshes. This pinion is fixed to the inner end of the shaft 10, which is rotatable in suitable bearings 11 and 12, mounted on the sills 1. A convenient type of bearing is further illustrated in Figure 3, and is employed for convenience in demounting the shaft 10, which must often be done for repairs. This form of bearing includes a concave seat 13 in the sill 1, and a correspondingly shaped block 14, fitted therein and which has a flat upper face. Mounted upon this block is the bearing proper formed with the removable cap 15, which is bolted on the bearing and which may be readily removed. Suitable bolts 16, 16 are passed upwardly through the plate 13, the block 14 and the bearing flanges 17, 17, and are secured in place by means of nuts threaded onto the upper ends thereof. In case it is desired to demount the pinion 9, the cap 15 and the bolts 16 may be removed and the block 14 then moved around in the concave seat wherein it rests so as to withdraw the supporting bearing from the shaft and this will permit the pinion to drop down out of mesh with the rotary table so that it can be removed and a new one replaced without dismantling the entire rotary.

Loosely mounted on the shaft 10, there is a sprocket wheel 18 to which rotation is imparted by means of a suitable sprocket chain (not shown), and the inner face of this sprocket wheel has a clutch member 19 with which the clutch 20 may be engaged. This clutch is splined on the shaft and when engaged with the clutch member 19, it imparts rotation to said shaft. This clutch may be manipulated into and out of engagement, by means of the clutch lever 21, and through the instrumentality of the clutch yoke 22.

The rotary table has a central opening thereto, to permit the passage of the drill stem and the wall of this opening is provided with oppositely disposed vertical dovetailed grooves 23, 23 into which the correspondingly shaped dovetailed posts 24, 24 fit. The upper ends of these posts are bifurcated, forming the spaced fingers 25, 25 and extending transversely through aligned bearings in these fingers, are the adjusting shafts 26, 26. The sections of these shafts, between said fingers, are polygonal in form, as shown in Figures 1 and 8, to receive a wrench, by means of which the shafts may be turned and the ends of the shafts are reversely threaded, and screwed through the corresponding ends of the oppositely disposed castings 28, 28. These castings are hood-like in form and have smooth upper surfaces thus forming a convenient table for the tools used in operating the rotary, and also protecting the working parts of the pipe gripping device, as well as protecting the workman from injury thereby. Each casting has a grip ring shaft 29, arranged at right angles to and in the same plane with the adjusting shafts 26, and having end bearings in said castings. Rotatably mounted on these shafts 29, are the sleeves 30, 30 upon which the spaced grip rings 31, 31 are splined. These grip rings are provided to engage with and rotate the drill stem.

It is obvious that by applying a wrench to the adjusting shafts 26, as hereinbefore explained, and turning said shafts in one direction, the castings 28 may be forced apart and the grip rings released from the stem and by turning said shafts in the other direction the castings may be pulled together, and the grip rings carried into engagement with the pipe. When adjusted to any position, the shaft 26 may be locked against any further movement, due to vibration in operation, by means of the locking dog 32, shown in Figure 8. This dog is formed to fit over the polygonal section of the shaft 26 between the fingers 25, and it has an extension 33 which engages against the web 34, between said fingers and the shaft 26, to which it is applied, will be thereby locked against rotation, and the grip rings thus held securely in engagement with the drill stem. As the castings 28 are adjusted back and forth, they move on the transverse tracks 34, which are dovetailed in the undersides thereof, and which are formed integrally with the respective posts 24, 24.

For the purpose of anchoring the rotary table to the bed plate, I have provided an annular groove 35 around the periphery of the table underneath the gear face 8 and an anchor, presently to be described, is secured to the bed plate, and fits into this groove on the driven side of the table. This anchor includes an arcuate rib 36 which fits in the groove 35 and formed integrally with this rib, on each side of the driving pinion 9, are the anchor posts 37, 37, and the respective ends of the rib have similar anchor posts 38, 38. These posts are bifurcated, forming the fingers 37' and 38', which are spaced apart, forming the slots 39 and one of the fingers 37' is extended through the base plate and outwardly threaded to receive the nut 40. The base plate is formed with an integral upstanding bearing flange 41 around the raceway ring, having the integral ribs or braces 41' spaced apart therearound, and the anchor posts are secured to the inner side of this bearing flange, opposite said braces, by means of suitable bolts 42. These bolts pass through the respective slots 39, and also through the flange 41. The inner end of each bolt 42 is formed with a head which is seated in a counter-sunk groove 43, in the inner side of the anchor post, so as to bring said head flush with the inner side of the post. And the outer end of each bolt 42 is threaded to receive the nut 44, which is screwed thereon. As shown in Figure 4, the outer face of each anchor post is knurled or roughened so that it will not readily slip in the flange 41. The anchor for the rotary table is thus securely fastened to the base plate, but may be adjusted to take up any wear, by loosening the nuts 44 and tightening up one of the nuts 40, and then again tightening said nuts 44. It is to be noted that the rotary table is anchored down at its thrust-receiving side, that is, on the side of the driving pinion 9, and may be readily adjusted to take up any wear of the intermeshing teeth. The flange 41 not only protects the reduced lower end of the rotary, but also strengthens the base plate.

In drilling through hard formation, the drill stem often "jumps," imparting an upward thrust which has a tendency to lift the rotary table from the base plate and the rib 36 is extended around in the groove 35 on each side of the pinion 9, a sufficient distance to prevent the displacement of the rotary table, by reason of the "jumping" of the drill stem or from any other cause so that said table will at all times be securely held in position.

What I claim is:

1. A rotary, including a base plate, a rotary table mounted thereon and formed with a beveled gear face and an annular groove, a driving pinion in mesh with said gear face, an anchor for holding the table on the base plate, said anchor consisting of an annular upstanding flange integral with the base plate, and closely surrounding the rotary table; an arcuate rib fitted into said groove and anchor posts formed integrally with the rib and secured to the flange on opposite sides of said pinion.

2. A rotary, including a suitable base, a table rotatably mounted thereon and formed with an annular peripheral groove, means for rotating the table, an anchor for holding the table on the base, said anchor consisting of an annular upstanding flange integral with the base and closely surrounding the rotary table; an arcuate rib adapted to fit into said groove, and anchor posts secured to the rib and adapted to be secured also to said flange on opposite sides of said rotating means.

3. A rotary, including a base plate, a rotary table mounted thereon and formed with a beveled gear face and an annular peripheral groove, a drive pinion intermeshing with said gear face and imparting rotation to the rotary table, an anchor provided to withstand the thrust of said pinion and including an annular upstanding flange integral with the base plate and closely surrounding the rotary table; an annular rib fitted into said groove, and anchor posts arranged on opposite sides of the pinion, said posts being formed integrally with the rib and being secured to the flange.

4. In a rotary, a base plate, a rotary table mounted thereon, a pipe gripping device carried by the table, said pipe gripping device including opposing castings, grip rings mounted thereon, adjusting shafts threaded through said castings, through which the castings may be adjusted toward and from each other by rotating the shafts, and a locking dog adapted to be applied to said shafts to prevent the rotation thereof.

5. In a rotary, a supporting post, an adjusting shaft having a bearing in said post, a locking dog adapted to be applied to the shaft and which locks against the post to prevent the rotation of the shaft, and a pipe gripping device carried by the rotary and with which said adjusting shaft is operatively connected.

6. A rotary including a base plate having an upstanding annular bearing flange forming a housing, a rotary table mounted on the base plate and formed with a beveled gear face, said rotary being reduced beneath said gear face and fitting within said bearing flange housing, means for holding the table on the base plate and means for driving the rotary.

7. A rotary including a base plate having a central opening, an upstanding annular bearing flange carried by the base plate, and surrounding said opening and forming a housing, a rotary table mounted on the base plate, and fitted within said housing, means for holding the table anchored to the base plate and means for driving the rotary.

In testimony whereof I have signed my name to this specification in the presence of two subscribing witnesses.

HARRY R. DECKER.

Witnesses:
J. C. McCORMICK,
G. C. BEARDSLEY.